US011019065B2

(12) United States Patent
Jacobs

(10) Patent No.: US 11,019,065 B2
(45) Date of Patent: May 25, 2021

(54) DIGITAL CONSENT SYSTEM AND ASSOCIATED METHODS

(71) Applicant: Caterpillar Inc., Deerfield, IL (US)

(72) Inventor: Jeffrey A. Jacobs, Washington, IL (US)

(73) Assignee: Caterpillar Inc., Peoria, IL (US)

( * ) Notice: Subject to any disclaimer, the term of this patent is extended or adjusted under 35 U.S.C. 154(b) by 191 days.

(21) Appl. No.: 16/189,406

(22) Filed: Nov. 13, 2018

(65) Prior Publication Data

US 2020/0153835 A1 May 14, 2020

(51) Int. Cl.
*H04L 29/06* (2006.01)
*G06F 21/62* (2013.01)

(52) U.S. Cl.
CPC ........ *H04L 63/102* (2013.01); *G06F 21/6218* (2013.01); *H04L 63/0815* (2013.01); *H04L 63/105* (2013.01); *H04L 63/205* (2013.01); *G06F 2221/2141* (2013.01)

(58) Field of Classification Search
CPC .......................... H04L 63/102; G06F 21/6218
See application file for complete search history.

(56) References Cited

U.S. PATENT DOCUMENTS 6,314,425 B1 * 11/2001 Serbinis .............. G06F 21/6218
7,076,558 B1    7/2006 Dunn
9,064,033 B2    6/2015 Jin et al.
9,565,178 B2    2/2017 Sondhi et al.
9,621,357 B2    4/2017 Williams et al.
9,934,544 B1 *  4/2018 Whitfield .............. H04L 63/083
2013/0254897 A1 * 9/2013 Reedy .................. G06F 21/6218
                                                        726/26
2015/0127574 A1 * 5/2015 Daly, Jr. ................ G06Q 10/10
                                                        705/342
2017/0046528 A1  2/2017 Lambert

* cited by examiner

*Primary Examiner* — Chau Le
*Assistant Examiner* — Andrew Suh
(74) *Attorney, Agent, or Firm* — Lee & Hayes, PLLC

(57) ABSTRACT

A method includes generating a core record identification (ID) associated with an electronic document. A processor sets one or more access rules indicative of whether the electronic document may be edited after saving the document. The one or more access rules are associated with at least one administrator ID of an administrative user. The method further includes determining, based on a core record ID, whether or not to obtain the electronic consent of a consenting party. The processor evaluates whether the first consenting party ID must provide an electronic consent to the electronic document based on one or more organization consent rules indicative of i) whether consent is required for each access of the computing resource, and ii) whether per-user consent or organizational consent is required. The processor provides access to the computing resource based at least in part on the first consenting party and the core record ID.

20 Claims, 5 Drawing Sheets

DIGITAL CONSENT SYSTEM AND ASSOCIATED METHODS

TECHNICAL FIELD

The present disclosure relates generally to the field of electronic contract management, and more specifically to a control system and method for creating click-through agreements used to ensure validity of consent, user agreements that require consent before use, and for automated management of follow-up actions to inform application users.

BACKGROUND

It has historically been challenging for data governance administrators to manage consent-related information and meet best practice, legal, and/or regulatory objectives. When consent is obtained in different ways by different parties, it may be problematic to introduce variation in the administration of the consent, and introduce variation in the written agreements itself. For example, one party may use agreement A to obtain consent from party A, and in another office, another manager may use agreement A2 to obtain consent from party B. A problem arises with the agreement A and agreement A2 were used as documents to which consent is given, yet they are meant to apply to the same computing resource. In other respects, it may be problematic to obtain consent to a document, then subsequently (and unintentionally) change the document and terms consented to, without notifying the original consenting party.

An example system for managing consent is described in U.S. Pat. No. 7,076,558 B1 (hereinafter referred to as the '558 reference). The '558 reference describes a system and method for controlling access to user-specific information maintained in association with a web-services service. The '558 reference describes comparing a user's existing access permissions to default preferences that permit requested access, and creates rules in response that permit or prevent the request to be filled. The '558 reference does not, however, disclose details related to central management of consents that incorporate user-specific rules, organization-specific rules, jurisdictional considerations, and records of prior consent given for a particular document or application.

Example embodiments of the present disclosure are directed toward overcoming the deficiencies described above.

SUMMARY

In an aspect of the present disclosure, a computer-implemented method includes generating a core record identification (ID) associated with an electronic document. A processor sets one or more access rules indicative of whether the electronic document may be edited after saving the document to a computer-readable memory. The one or more access rules are associated with at least one administrator ID of an administrative user. The method further includes determining, using the processor, with the core record ID, an electronic consent content to display on a user device. The processor receives a first consenting party ID associated with the first consenting party, and evaluates whether the first consenting party ID must provide an electronic consent to the electronic document based on one or more user consent rules. The one or more user consent rules include an organization consent rule associated with organization. The organization consent rule indicates i) whether consent is required for each access of the computing resource, and ii) whether per-user consent or organizational consent is required. The method further includes transmitting the electric consent content for display, and obtaining a digital consent from the first consenting party based at least in part on the first consenting party ID in the core record ID. The processor provides access to the computing resource based at least in part on the first consenting party and the core record ID.

In another aspect of the present disclosure, a system for managing electronic consent includes a computer-readable memory, and a processor in communication with the computer-readable memory. The processor is enabled for generating a core record identification (ID) associated with an electronic document. A processor sets one or more access rules indicative of whether the electronic document may be edited after saving the document to a computer-readable memory. The one or more access rules are associated with at least one administrator ID of an administrative user. The method further includes determining, using the processor, with the core record ID, an electronic consent content to display on a user device. The processor receives a first consenting party ID associated with the first consenting party, and evaluates whether the first consenting party ID must provide an electronic consent to the electronic document based on one or more user consent rules. The one or more user consent rules include an organization consent rule associated with organization. The organization consent rule indicates i) whether consent is required for each access of the computing resource, and ii) whether per-user consent or organizational consent is required. The method further includes transmitting the electric consent content for display, and obtaining a digital consent from the first consenting party based at least in part on the first consenting party ID in the core record ID. The processor provides access to the computing resource based at least in part on the first consenting party and the core record ID.

In yet another aspect of the present disclosure, a non-transitory computer-readable medium comprising instructions for managing an electronic consent is described. The instructions are executable by a processor to perform a method. The processor is enabled for generating a core record identification (ID) associated with an electronic document. A processor sets one or more access rules indicative of whether the electronic document may be edited after saving the document to a computer-readable memory. The one or more access rules are associated with at least one administrator ID of an administrative user. The method further includes determining, using the processor, with the core record ID, an electronic consent content to display on a user device. The processor receives a first consenting party ID associated with the first consenting party, and evaluates whether the first consenting party ID must provide an electronic consent to the electronic document based on one or more user consent rules. The one or more user consent rules include an organization consent rule associated with organization. The organization consent rule indicates i) whether consent is required for each access of the computing resource, and ii) whether per-user consent or organizational consent is required. The method further includes transmitting the electric consent content for display, and obtaining a digital consent from the first consenting party based at least in part on the first consenting party ID in the core record ID. The processor provides access to the computing resource based at least in part on the first consenting party and the core record ID.

DETAILED DESCRIPTION

Example embodiments of the present disclosure include systems and methods for organizing and managing consent information. Such example embodiments may automate the process of administering consent, documenting user responses, and/or taking related actions to ensure that a user consent decision is upheld by a data governance administrator and the entity it represents.

Wherever possible, the same reference numbers will be used throughout the drawings to refer to the same or like parts.

With written documents, consent has historically occurred through signing a document with a hand-written signature (prior to the proliferation of digital documents). The signature signified a unique identification of an individual that considered some text in the document, and indicated that the signer agreed with the information written in the document. Absent express agreement to the text in the document, the signer would not have signed. When documents are delivered electronically, signatures (although sometimes signified with an actual hand-written signature of the consenting party) are generally typed or otherwise signified by selecting an "Agree" button or other mechanism. This type of electronic consent is sometimes called a "click-through agreement."

As introduced above, it is advantageous to provide a data processing system and method for monitoring, recording, and modifying information relating to electronic form contracts and statements to ensure that the party obtaining the consent carries out the wishes of the consenting party, to improve the user experience of everyone involved, and to bolster the legal validity of the consent by preventing subsequent actions that may weaken or invalidate the prior consent. For example, it is also desirable to provide a system that improves the overall validity of consent of a host application (external to the consent system) or many host applications by helping data governance administrators make decisions related to the consent of users and the entities they represent. An example system, as depicted in the computing environment shown in FIG. 1, may provide a central database of information, that allows users to view terms before expressing consent, prevents or limits access to a host application until consent is expressed, provides a path for users to view terms after consent and get support, and facilitates consistency in administration of the electronic consent content (e.g., the documents that the consenting party is reviewing, and to which they are providing consent).

Figure 1:
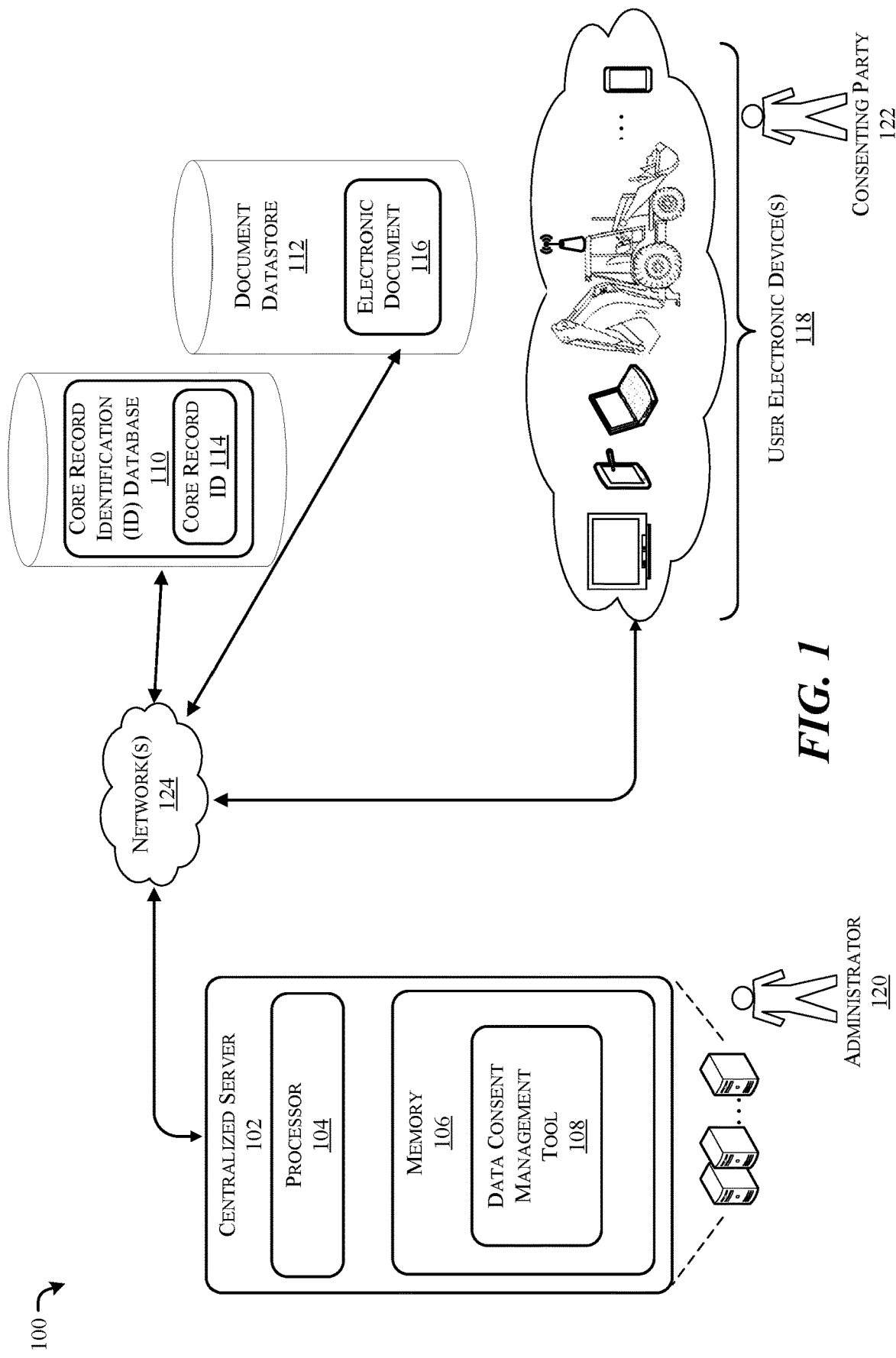
FIG. 1 is an example computing environment in accordance with an example embodiment of the present disclosure.

FIG. 1 is an example computing environment 100, in accordance with an example embodiment of the present disclosure. The computing environment 100 can include one or more centralized server(s) 102, a core record ID database 110, and a document datastore 112. The computing environment 100 may also include one or more user electronic devices 118. The centralized server 102 may be in communication with the core record ID database 110, the document datastore 112, and any one or more of the user electronic devices 118, via one or more networks 124.

The centralized server 102 may be configured to perform one or more aspects of organizing and managing electronic consent information, to automate the process of administering the consent, and administering the documentation for user responses. The centralized server 102 may take actions to ensure that the user consent decision is upheld by a data governance administrator (e.g., an administrator 120, as depicted in FIG. 1) and the entity it represents. The centralized server 102 (described hereafter in greater detail with respect to FIG. 2) can include a memory 106 storing plurality of software engines, modules, and/or other computer program code, such as a data consent management tool 108. The data consent management tool 108 may enable a computer processor 104 of the centralized server 102 to perform heuristics and steps described with respect to embodiments of the present disclosure. The data consent management tool 108 may be stored on the memory 106, (or in another computer-readable memory in communication with the centralized server 102) and executable by the processor 104 to perform one or more aspects of the present disclosure.

The core record ID database 110 may be enabled to store one or more core record IDs 114. As explained in greater detail hereafter, a core record ID 114 can include one or more data structures for persistent storage of records, rules, and other electronic information for managing electronic consent content and data records. The core record ID 114 can store information indicative of a consent given by a consenting party (e.g., a consenting party 122, as shown in FIG. 1). For example, as the consent is given by the consenting party 122, after the consenting party 122 has considered documents, disclosures, agreements, and other electronic material, that party may have and provided their consent or (or alternatively, declined to consent to the materials). The consent (or declined consent) may be stored as a core record ID 114.

According to one or more embodiments, the consenting party 122 may be an individual consenting on behalf of their own interests. For example, the consenting party 122 may be an individual user that that is agreeing (or declining agreement) to the terms of software or other online service. In another aspect, the consenting party 122 may be an individual consenting as an agent for an organization such as their employer, their business, another business/entity for whom they represent, or who may be consenting on behalf of a group of individuals, a legal entity, a government organization, etc. As used herein, the consenting party 122 may be an individual or an entity comprising multiple individuals.

The computing environment 100 may also include the document datastore 112 that stores one or more electronic documents 116. Although a single electronic document is depicted in FIG. 1, it should be appreciated that the document datastore 112 can include any number of electronic documents.

The user electronic device(s) 118 can include any number of various devices, including, for example, a laptop computer, handheld device, desktop computer, a computing system operational as part of a machine, heavy equipment, or other vehicle, a mobile phone, etc. In one aspect, a consenting party 122 may operate one or more of the user electronic devices 118. The user electronic devices 118 may communicate with the centralized server 102 for various purposes, including data transfer, machine control, information storage, etc. Because the consenting party 122 may generate and/or use data that can be persistently stored on one or more computer-readable memory and/or data stores associated with the centralized server 102, the consenting party 122 may often be informed of one or more intended uses for their data. For example, if the consenting party 122 has purchased or is otherwise using automated equipment that is enabled to communicate with the centralized server 102 for various aspects of its operation, the consenting party 122, as may be required by the laws and regulations of various jurisdictions in which they are operating their equipment, may be informed of aspects of the information, how the information is used, privacy information, agreements, reminders to agreements, acknowledgements, etc. Other reasons for obtaining the consent of the consenting party 122 are also contemplated, such as, for example, consents needed for aspects of a purchase, license agreements, etc.

In some aspects, an administrator 120 may be enabled to configure the data consent management tool 108 to provide system permissions for changing and releasing documents to which the consenting party 122 has reviewed and consented. The system permissions may control who can access a document, change the document, when the document may be changed, etc. The data consent management tool 108 may also set geographic rules based on one or more regions, countries and/or governmental jurisdiction. For example, in one aspect, the data consent management tool 108 may require a first type of consent for agreements executed in country A, and a second type of consent for agreements executed in country B. Data consent management tool 108 can also provide mechanisms that allow the administrator 120 to alter and/or otherwise set organization level permission and/or rules, user-level permissions and/or rules, and other types of permissions and/or rules, that can control what consents are required for various documents (for example the electronic document 116). In another non-limiting example, a first document may require a first type of consent, whereas a second document may require a second type of consent different from the first type of consent. In yet another non-limiting embodiment, the consent management tool 108 may set rules that control document interdependence. For example, a document (e.g., document B) may be dependent on in another document (document A). Stated another way, document B may reference information in, or incorporate another document by reference. Accordingly, the data consent management tool 108 may set a system permission based on the association of document B with document A such that when document A is edited (or a new version number of that document is created), document B must also be edited to a new version number (and consents associated with both of documents A and B must be renewed and/or obtained again). In another example, a document may include multiple consents within a single document, where the consents obtain independent consents for governance statements, arbitration clauses, etc. Other data consent management rules are contemplated.

Electronic consent content, as described herein, may include any one or more electronic documents. For example, the user agreement to which consent is given by user (or alternatively, to which consent is withheld) can be characterized as a consent type of various types that include, for example, a cookie statement, a data governance statement, an end user license agreement, a global data privacy statement, a privacy notice, a remote services process (or description thereof), one or more terms of sale, one or more terms of use, and/or other various notices. The consent content may be a document or part of a document such as the electronic document 116.

Figure 2:
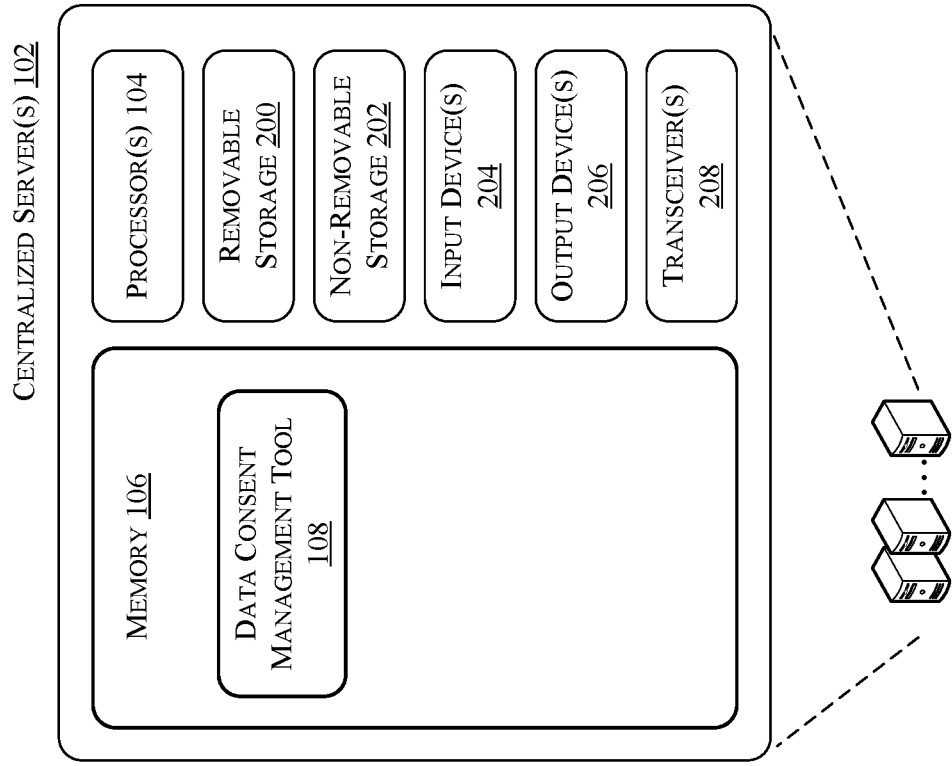
FIG. 2 is a block diagram schematically representing a centralized server in accordance with an example embodiment of the present disclosure.

FIG. 2 is a block diagram schematically representing the centralized server 102 of FIG. 1 in more detail, and in some examples, the centralized server 102 may be used to implement the various operations described herein. In example embodiments, the centralized server 102 can be implemented as a single device or as a plurality of devices with modules and data distributed among them. For example, the centralized server 102 may include memory 106 storing the data consent management tool 108, among other software modules. Also, the centralized server 102 can include the processor 104, a removable storage 200 a non-removable storage 202, one or more input device(s) 210, one or more output device(s) 212, and/or one or more transceiver(s) 214.

In various embodiments, the memory 106 may be volatile (such as RAM), non-volatile (such as ROM, flash memory, etc.) or some combination of the two. The data consent management tool 108 stored in the memory 106 can include methods, threads, processes, applications or any other sort of executable instructions. In some embodiments, the processor 104 may be one or more processors that are central processing units (CPUs), graphics processing units (GPUs), or both CPU and GPU, or other processing units or components known in the art.

The centralized server 102 may also include additional data storage devices (removable and/or non-removable) such as, for example, magnetic disks, optical disks, or tape. Such additional storage is illustrated in FIG. 1 by the core record ID database 110 and the document datastore 112. In some aspects, the core record ID database 110 may be the same datastore as the document datastore 112. In other aspects, the core record ID database 110 may be a different datastore than the document datastore 112. Because the consent content may be delivered electronically to one or more user electronic devices 118, the document datastore 112 and the core record ID database 110 may be accessible via the network 124 to the centralized server 102 and the one or more user electronic devices 118.

Tangible computer-readable media can include volatile and nonvolatile, removable and non-removable media implemented in any method or technology for storage of information, such as computer readable instructions, data structures, program modules, or other data. The memory 106, removable storage 200 and non-removable storage 202 are all examples of computer-readable storage media. Computer-readable storage media include, but are not limited to, RAM, ROM, EEPROM, flash memory or other memory technology, CD-ROM, digital versatile discs (DVD), content-addressable memory (CAM), or other optical storage, magnetic cassettes, magnetic tape, magnetic disk storage or other magnetic storage devices, or any other medium which can be used to store the desired information and which can be accessed by the centralized server 102. Any such tangible computer-readable media can be part of the centralized server 102.

The centralized server 102 also can include input device(s) 204, such as a keypad, a cursor control, a touch-sensitive display, voice input device, etc., and output device(s) 206 such as a display, speakers, printers, haptic feedback, etc.

As illustrated in FIG. 2, the centralized server 102 may include one or more wired or wireless transceiver(s) 208. For example, the transceiver(s) 208 can include a network interface card (NIC), a network adapter, a LAN adapter, or a physical, virtual, or logical address to connect to the network(s) 124, and the user electronic devices 118. The transceiver(s) 208 can comprise any sort of wireless transceivers capable of engaging in wireless, radio frequency (RF) communication. The transceivers 208 can also include other wireless modems, such as a modem for engaging in Wi-Fi®, WiMAX®, Bluetooth®, or infrared communication.

Figure 3:
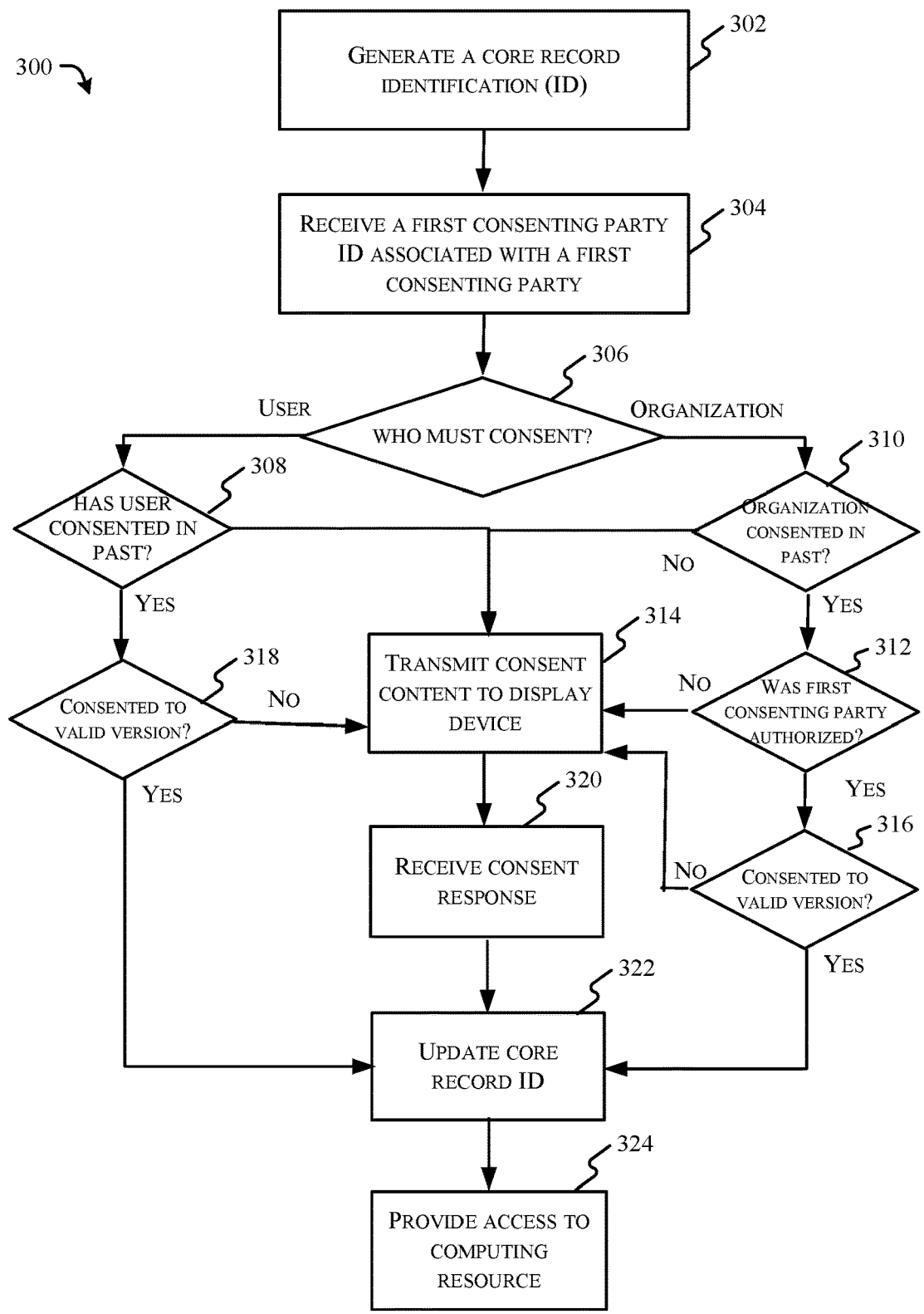
FIG. 3 is a flow chart depicting a method of managing an electronic consent in accordance with an example embodiment of the present disclosure.
Figure 4:
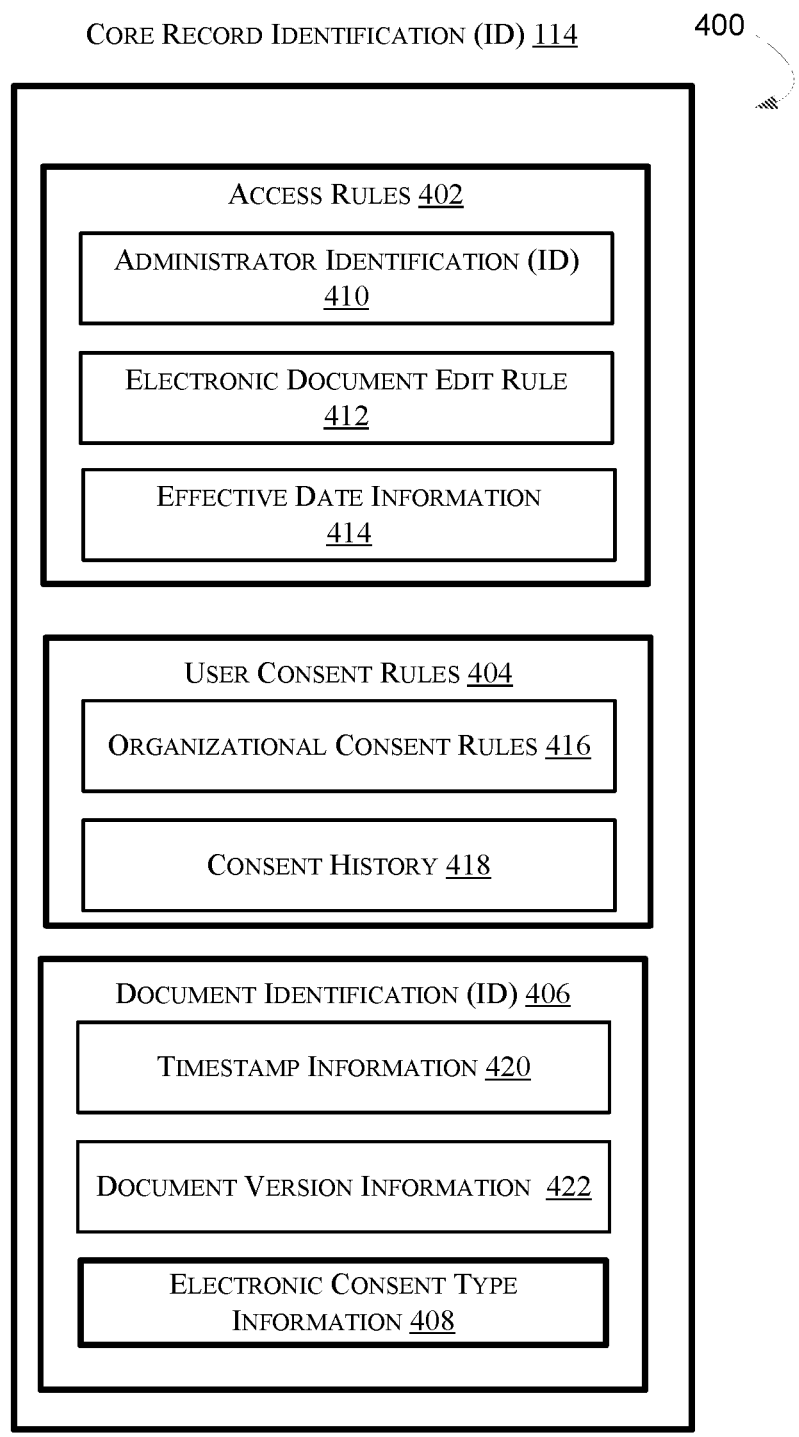
FIG. 4 is a block diagram illustration of a core record identification (ID) according to an example embodiment of the present disclosure.

FIG. 3 is a flow chart depicting a method of managing an electronic consent, in accordance with an example embodiment of the present disclosure. FIG. 4 is a block diagram illustration of a core record ID according to an example embodiment of the present disclosure. FIGS. 3 and 4 are considered together.

According to an embodiment, a process of managing a user consent can include one or more steps, such as creating core record ID, and saving the core record ID to the core record ID database 110. The core record ID may be retrievable by the centralized server 102 when a consenting party logs in (providing their identification at the login), and requests access to a computing resource, where that access may require that the consenting party provide their electronic consent to terms or other agreements.

Considering the generation step, at step 302 of FIG. 3, the processor 104 may present one or more queries to a person, receive inputs in response to the queries, and generate a core record ID based in part on one or more of the inputs. For example, the processor 104 may prompt administrator 120 for input to establish the core record ID (e.g., the core record ID 114, as shown in FIG. 1). According to one embodiment, generating the core record ID 114 can include uploading an existing document with which the core record ID will be associated, and/or downloading from a document database (for example the document datastore 112) with which the processor 104 may associate the core record ID. For example, the processor 104 may output a dialog box via the output device 206 that is viewable by the administrator 120. The dialogue box may provide one or more search parameters and/or search tools that are usable for searching the core record ID database 110, and/or the document datastore 112 for a document that includes consent content. For example, the processor 104 may output an example document search dialog box that can include one or more input fields specifying parameters for the document search, including, for example, a document identification number, a field specifying a document name, a field for specifying a document type, and/or a pulldown menu that includes one or more of a plurality of document types. The dialog box may further include an input for an uploaded date of the document being searched. By searching for a prior consent document, the administrator may save time by accessing one or more electronic documents to be used as a starting point.

According to an embodiment, the electronic documents in the document datastore 112 may include information categorized in several ways, including by consent type. As used herein, a consent type can include any type of electronic consent statement or series of statements that may be saved as an electronic document and presented electronically to the consenting party 122 using a display device such, as for example, one or more displays of the user electronic devices 118. Consent types can include any number of user consent statements known in the art, such as, for example, a cookie statement, a governance statement, an end user license agreement, a global data privacy statement, a privacy notice, a remote services process (or description thereof), one or more terms of sale, one or more terms of use, and/or any other various notice that may inform the consenting party 122. Another distinguishing factor of any one or more of the types of electronic consent may be that the consenting party 122 may signify agreement to the terms of an electronic consent statement, or decline agreement to the terms in the statement in some way, such as, for example, by selecting a radio button indicating the consenting party 122 agreement or declining agreement. Other ways of providing a consent response are also contemplated, including a digital signature, a typed statement indicating the user's agreement, etc.

According to an embodiment, at step 302 the processor 104 may generate a core record ID that identifies a document retrieved by a document search (or alternatively, a document uploaded by the administrator 120), and saves the details and rules governing how the electronic consent will be managed, including what person or persons may have permission to change the core record ID-related document (e.g., the electronic document 116). It may be disadvantageous to save the electronic document 116 to be presented to one or more consenting parties (for example the consenting party 122) and allow the document to be edited or changed in some way after the consenting party 122 has provided their consent to the terms of that document. Accordingly, it may be advantageous to provide one or more rules associated with the electronic document 116 that uniquely identify the electronic document 116, control editing the electronic document 116, and/or control how individuals must provide consent to the electronic document 116.

Considering FIG. 4, an example core record ID 114 is shown, according to an embodiment. The core record ID 114 includes a plurality of data consent management rules 400 that control how a corresponding electronic document is managed (for example who can access the document edit the document and otherwise modify a document once the document is created), and/or how consenting parties must interact with the data consent management tool to provide their consent to the electronic document 116. The data consent management rules 400 can include access rules 402, one or more user consent rules 404, at least one document ID 406, and electronic consent type information 408.

The core record ID 114 may include one or more user consent rules 404 having logic that controls what type or class of user (for example the consenting party 122) must consent to a particular document, and if that class of consenting party is included with specific organization rules that control who within the organization can consent to an agreement on behalf of the organization. The core record ID 114 may also include a document ID 406 having information that uniquely identifies a document. The document ID 406 may include timestamp information 420, document version information 422, and electronic consent type information 408.

According to one embodiment, a core record ID (for example core record ID 114) may be uniquely associated with a particular document or group of documents stored in the document datastore 112. For example, the core record ID 114 may be associated with the electronic document 116 stored in the document datastore 112 (as shown in FIG. 1). Information indicative of the association between the core record ID 114 and electronic document 116 may be stored in the document ID 406. The document ID 406 may include timestamp information 420, which may be indicative of date and time information at which a particular document associated with the core record ID 114 was created and/or modified.

The document ID 406 may also include document version information 422, indicative of a version number for the document identified in the document ID 406. The document ID 406 may also include an identification number or other encoded alpha-numeric or other string that uniquely identifies one or more documents associated with the document ID 406. For example, the centralized server 102 may generate ID information that uniquely identifies a document, and include the ID information as part of the documents in the document datastore 112. In another aspect, the centralized server 102 may append the ID information to one or more documents such that the assigned ID information appears on the document in some way. In one non-limiting example, the ID information may be added to the document(s) in a footer, in a header, or in another way.

As described with respect to FIG. 3, in some aspects, one or more documents in the document datastore 112 may be searchable by the data consent management tool 108. For example, the documents may be searchable by the timestamp information 420, the document version information 422, and/or other types of identifying information such as, for example, the electronic consent type information 408 associated with the electronic document 116.

The access rules 402 may include one or more electronic document edit rule(s) 412 that may be applied by the processor 104 to control how, when, and by whom the electronic document identified in the document ID 406 may be edited, deleted, etc. The electronic document edit rule 412 may include one or more rules applicable to controlling the parties that are allowed to edit the electronic document(s) associated with the core record ID 114 (for example the electronic document 116). The access rules 402 can include an administrator ID 410 that uniquely identifies an individual acting as the administrator (e.g., the administrator 120), one or more electronic document edit rules 412, and effective date information 414. The access rules 402 can include rules that affect whether the electronic document 116 may be edited after saving the document to a computer-readable memory (e.g., the document datastore 112). For example, the administrator 120 may have a unique administrator ID which centralized server 102 may compare to one or more access rules saved as part of the core record ID to determine whether or not a particular administrator requesting to change electronic document 116 may be allowed to change the document. In one aspect, the one or more access rules 402 may include a rule identifying a particular user (for example the administrator 120, and no other user) authorized to change a particular document associated with the core record ID 114. In other aspects, the access rules 402 may identify a plurality of users (not shown) authorized to edit the electronic document 116. The one or more authorized users that can change a particular document associated with the core record ID 114 may be saved as an entry in the administrator ID 410.

The access rule 402 may further include the effective date information 414, that can specify a current or future date at which electronic document 116 will become effective and subject to one or more electronic consents by consenting parties. In another aspect, the effective date information 414 may include a future date or a range of dates during which electronic document 116 may be edited, and may include one or more statuses associated with the electronic document 116. The one or more statuses may be indicative of an action or series of actions that must take place after a document is changed after creation of the core record ID 140. For example, status for email notification may require that an email be generated by the centralized server 102 if one or more authorized administrators make a change to the electronic document 116 after creation of the core record ID 114. Other access rules are contemplated.

The user consent rules 404 can include logic that dictates how electronic consents may be required for a particular document or documents with respect to all users of a computing resource (for example the consenting party 122), and/or a class of users (for example types of employees within a particular organization that must consent to a particular document, and the types consenting parties within a particular organization that need not consents to a particular document). Employee classes may include, for example, customers, dealers, internal employees of a particular organization, groups of employees, users associated with the organization but external to the organization (non-employees), etc.

In other aspects, the core record ID 114 may include one or more rules instructing how the internal users of a particular organization must interact with an electronic document (e.g., the consent content) responsive to a request for access to a computing resource. For example, in one aspect the organizational consent rules 416 can include logic indicative of one or more parties within an organization that may be required to consent responsive to a request to access a computing resource, how often their consent is necessary (for example at each access of a computing resource, or only during the first access of that computing resource), and other rules pertaining to individuals within an organization.

As another example, the user consent rules 404 may include rules governing how electronic consent is given by members of an organization. For example, an organization may include many employees that access a particular computing resource, where the user consent rules 404 may require a consent at each access of the resource. In other aspects, having every employee provide their electronic consent at each access of the computing resource may not be necessary. In another example, it may not be necessary for every employee of the organization to provide their consent, but only one key employee to provide consent on behalf of the entire organization. As another example, it may only be necessary for some employees to provide their consent for access to a computing resource based on particular computing resources that will be accessible by those employees. Rules that dictate who within an organization must consent to a particular document, when that consent must take place (for example how often), and other particulars that control the required electronic consent associated with the electronic document 116, may be stored in the user consent rules 404 under the organizational consent rules 416.

A computing resource, as used herein, may be any resource associated with the centralized server 102 that triggers the need for electronic consent by the consenting party 122. By way of example, the consenting party 122 may enter into a dealership selling heavy equipment embodied as one of the user electronic devices 118 for example. Because the heavy equipment involves user data that may be managed by or at least managed in part by the centralized server 102, one more electronic consents may be necessary to ensure that the consenting parties wishes are followed by the organization associated with the centralized server 102. Accordingly, the consenting party 122 may request access to a computing resource (heavy equipment) and another party at the dealership may present an electronic device to the consenting party 122 to sign in to the electronic device using a unique user ID.

With continued reference to FIG. 3, at step 302 processor 104 may generate a core record ID 114 that controls aspects of how the data consent management tool 108 will manage electronic consents for an identified document associated with the core record ID 114. The processor 104 may generate one or more dialog boxes that interactively allows an administrative user (for example the administrator 120) to generate the core record ID 114 based on criteria including the access rules 402, the user consent rules 404, the document ID 406, etc. The processor 104 may store the core record ID 114 in the core record ID database 110 and/or store any documents such as the electronic document 116 in a document datastore 112. As earlier explained, the core record ID 114 may contain the heuristics and other business logic that control an electronic consent associated with a particular document (for example electronic document 116). In one aspect, retrieval of the core record ID 114 by the data consent management tool 108 may be triggered by receiving a request to a computing resource by the consenting party 122, after the core record ID 114 has been generated by the processor 104 and saved to the core record ID database 110.

The user ID may be for example, an identifying login associated with the consenting party 122. By logging into the user electronic device 118, and requesting access to the computing resource, the central server 102 may receive the request and associate a particular electronic document (e.g., the electronic document 116) with the request received by the consenting party 122. The processor 104 may form an association of the consenting party 122 and the electronic document 116 based on information stored in the core record ID 114.

At step 304, the processor 104 may receive the first consenting party ID associated with the consenting party 122. At step 306, the processor 104 determines who must consent based on one or more of the plurality of data consent management rules 400. Accordingly the processor 104, via the network 124, may retrieve the electronic document 116 and/or the core record ID 114 associated with the requested computing resource via the network 124. The processor 104 may determine, using one or more of the data consent management rules 400, whether the consenting party 122 must consent to the computing resource requested. Accordingly the processor 104 may determine whether the requesting consenting party 122 is a user or an organization.

In some aspects, if the consenting party 122 is a user that is not affiliated with an organization rule, at decision step 308, the processor 104 may determine whether or not the consenting party 122 has consented in the past. The processor 104 may evaluate, based on the consent history 418, whether the consenting party 122 must consent for the first time, re-consent subsequent to a prior consent, or whether there is no need for consent at all.

In one example scenario, the processor 104 may determine that, although the consenting party 122 has consented in the past by providing an electronic consent or some other form of consent recorded in the consent history 418, a new consent may be necessary. For example, if the consenting party 122 consented to a previous version of the electronic document 116 (e.g., version A) but that document had been subsequently changed by an administrator 120, a new consent may be necessary. In this example, then, the prior consent was given to an old document version and is no longer effective in view of the newer controlling document. Therefore, as shown in decision step 318, the processor 104 may evaluate whether the consenting party 122 has consented to a valid version of the electronic document 116 prior to the present date and time, to determine whether another consent is necessary.

As another example, the consenting party 122 may have consented to an invalid version of the electronic document 116 (determined by the document version information 422). As shown at step 314, the processor 104 may transmit consent content (e.g., the electronic document 116) to display in the user electronic device 118 so that the consenting party 122 may review that content, and provide a consent response. For example, continuing with the same example, the consenting party 122, being at the dealership, may review paperwork associated with a new purchase of the heavy equipment. After selecting one or more finalization steps of the purchase, the consenting party 122 may be presented with the electronic document 116 for a new (or renewed), and the data consent management tool 108 may request an electronic consent to the electronic document 116. Accordingly, the processor 104 may transmit the consent content (the electronic document 116) to the user electronic device 118. The user electronic device 118 may present the consent content to the consenting party 122, and receive a user response from the consenting party 122 indicative of an affirmative response (consenting to the content of the electronic document 116) or a declining response (indicative of non-consent of electronic document 116). At step 320, the processor 104 may receive the consent response via the network 124.

The processor 104 may present the consent content to the user electronic device 118 in various ways. In one non-limiting example, at logon (that is, the consenting party 122 or another user presents logon credentials on the user electronic device in a request to use a computing resource). During or after the logon process, the user electronic device 118 transmits a call, or directs the user through a URL or other methods, to the central system asking the centralized server 102 to check the consent status related to a software application (referred to herein as a host application) associated with the centralized server 102. If the centralized server 102 determines that consent is required, then the host system (e.g., the user electronic device 118) presents a URL/page that displays and gathers the consent from the consenting party 122. The centralized server 102 then sends the user electronic device 118 then sends a logon confirmation to the user electronic device 118, host application with permission to enter.

In another non-limiting example, the processor 104 may present the consent content to the user electronic device 118 via an inline frame (I-frame) that may be embedded inside of another HTML document on an intranet website and intranet website or other computing resource. Accordingly, the processor 104 may generate the consent content (for example, the electronic document 116) via the I-frame. In another aspect, the processor 104 may transmit electronic document 116, via the network 124, to the user electronic device 118.

The user electronic device 118, using the host application on the user electronic device 118, may present the consent content via a display device of the user electronic device 118. The consenting party 122 may provide an electronic response indicative of consent or non-consent to the electronic document 116. The user electronic device 118 (or alternatively, centralized server 102 via an I-frame or other technology) may receive the consent response, and update the core record ID 114 based on the consent response by updating the consent history 418 of the core record ID 114.

The consent history 418, accordingly, may now include an updated user response indicative of either consent to the valid version of electronic document 116, or a decline of consent to the electronic document 116. In step 324, the processor 104 may, based on receipt of the consent response, provide access to the computing resource.

Referring again to the decision at step 306, where the processor 104 determines who must consent, the prior example demonstrated a scenario where an individual user (not part of an organization) provided consent to the electronic document 116. In another example, the consenting party 122 may be an employee of an organization, such as, for example a large mining organization that maintains a number of heavy mining equipment, some of which being sold by a dealership. If the consenting party 122 is at the dealership purchasing a new piece of mining equipment on behalf of the organization, it may be advantageous for the processor 104 to recognize the user (via the unique user ID associated with the first consenting party), and recognize that user's ability to provide effective consent on behalf of the organization. For example, the recognition may include whether or not an organization associated with the consenting party 122 has particular user consent rules that dictate whom should consent, given various circumstances. Accordingly, at the decision step 306, the processor 104, while determining who must consent, may access the user consent rules 404 of the core record ID 114 responsive to receiving the user ID of the consenting party 122. In particular, the one or more organizational consent rules 416 may indicate whether i) consent is acquired at each access of the computing resource, and ii) whether per-user consent is required to access the computing resource, or whether organizational consent is required. For example, even though the consenting party 122 may be part of an organization, the data consent management rules 400 may indicate that every individual in an organization must consent at each access of the computing resource. In another aspect, the data consent management rules 400 may indicate that a single individual from the organization is required to consent on behalf of the organization.

Accordingly, at step 310, the processor 104 may determine who in an organization associated with the consenting party 122, has consented in the past to accessing the computing resource. To make this determination, the processor 104 may access the user consent rules 404, and more particularly, the consent history 418. In one example, the processor 104, using the consent history 418, may determine that an individual from the organization associated with the consenting party 122 has previously consented to electronic document 116. It may be advantageous, therefore, for the processor 104 to determine whether the first consenting party recorded in the consent history 418 was authorized to consent on behalf of the organization. For example, if the consent history shows that the consenting party that provided consent in the past was a low-level employee purporting to consent on behalf of the organization, is advantageous to obtain proper consent (that is, consent from an authorized individual empowered by the organization to consent on behalf of the organization) based on one or more of the user consent rules 404. The proper consent may include, for example, obtaining the consent of an authorized consenting party such as an executive, a general manager, or another authorized individual that is authorized according to the organizational consent rules 416.

At step 316, if the processor 104 determines that the first consenting party was authorized, the processor 104 may update the core record ID to indicate that the consenting party 122 did not need to re-consent, and the processor 104 may provide access to the computing resource (as shown in step 324).

At decision step 316, if the processor 104 has determined that the prior consent or as shown in the consent history 418 was not an authorized party (again the decision being based on organizational consent rules 416), the processor 104 may transmit the consent content (for example electronic document 116) to the display device of the user electronic device 118. The consenting party 122 may provide a consent response via the network 124.

As shown in step 320, the processor 104 may receive the constant consent response via the network 124, and update the core record ID, as shown in step 322. More particularly, the processor 104 may update the consent history 418 to include information indicative of an identification of the consenting party 122, date and time information, and/or other information associated with the consent of the consenting party 122. The processor 104 may again provide access to the computing resource, shown in step 324.

Figure 5:
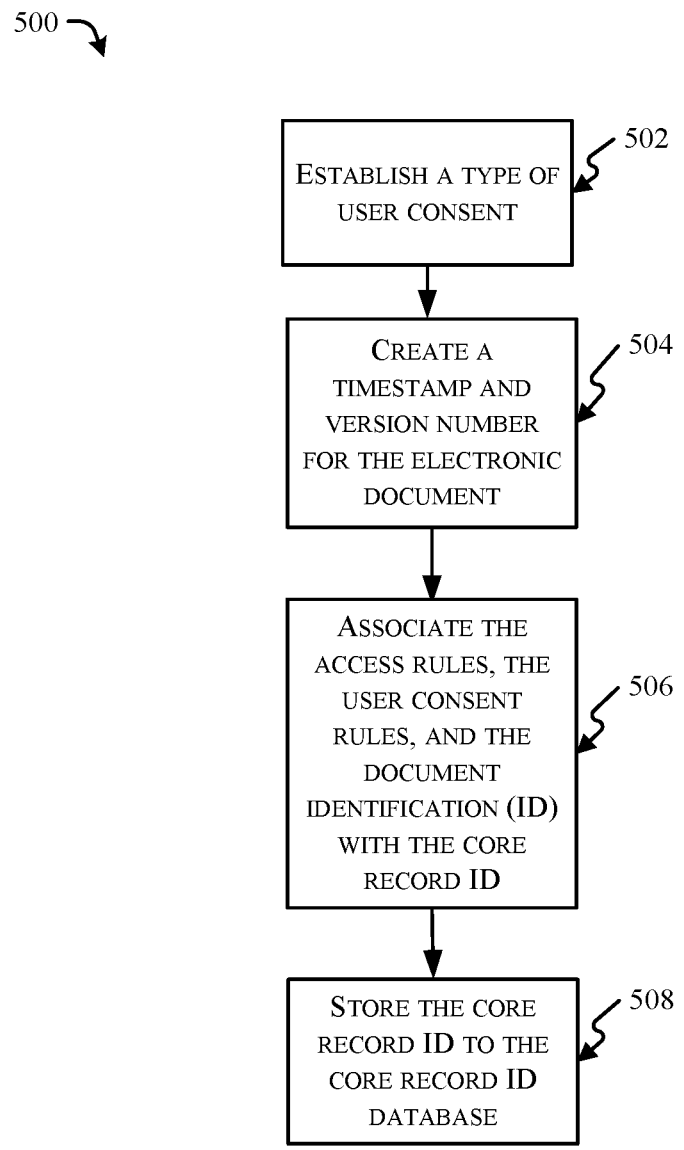
FIG. 5 is a flow chart depicting a method of setting one or more access rules according to an example embodiment of the present disclosure.

FIG. 5 is a flow chart depicting a method 500 of setting one or more data consent management rules, according to an example embodiment of the present disclosure. When the core record ID 114 is established by the administrator 120, the processor 104 may present user prompts and user inputs used by the processor 104 to write data consent management rules that govern how, when, and/or by whom, electronic consents should be provided by a consenting party. Because of the secure nature of user consent, it may be advantageous to ensure that a baseline integrity of the underlying documents to which parties are consenting is maintained by the organization associated with the centralized server 102. As shown in FIG. 5, at step 502, the processor 104 may establish a type of user consent content associated with the electronic document 116. For example, the processor 104 may prompt an administrator 120 input to provide information indicative of the electronic consent type information associated with the electronic document 116. The consent type information received by the processor 104 is saved to the core record ID 114 as the electronic consent type information 408.

At step 504, the processor 104 may create a timestamp and version number for the electronic document 116. Accordingly, the processor may create a document ID indicative of a date and time that the electronic document is created, and assign a version number of the electronic document 116. The date and time stamp may also include a date and time in the future during which the electronic document 116 is to be active. A document is active when the data consent management tool 108 presents that electronic document to one or more consenting parties.

At step 506, the processor 104 may associate the one or more access rules, the one or more user consent rules, and the document ID with the core record ID by completing the data structure associated with the core record ID 114. The data structure may provide links between the access rules 402, the one or more user consent rules 404, and the document ID 406. The linked information that constitutes the core record ID 114 may be persistently saved data structure, or a set of data linked together in some way such as, for example, a database record, lookup table, or some other mechanism.

At step 508, the processor 104 may store the core record ID 114 to the core record ID database 110.

Although the present examples used to explain one or more aspects of the present disclosure include electronic consents directed to use of electronic resources, it should be appreciated that embodiments may be applicable to any type of consent that is obtained, for any reason. For example, electronic consent may include consent to the use of a website or other software, consent to a procedure, consent to a legal agreement, medical consent, or some other type of consent.

INDUSTRIAL APPLICABILITY

The present disclosure provides systems and methods for creating click-through agreements used to support and/or improve validity of consent. The systems and methods may provide management for user agreements that require consent before use, and for automated management of follow-up actions to inform application users. Systems and methods described herein may ensure that supporting systems follow the expressed intent of the user. Such systems and methods may be used to achieve better adherence to user wishes, and may minimize organizational risks associated with out-of-compliance user agreements. Additionally, such systems and methods may be used to improve efficiencies in user agreement management by allowing multiple versions of user agreements to be changed at a central location.

Aspects of the present disclosure may limit organizational risk associated with inconsistent administration of user consent agreements. For example, an agreement or consent may be weakened or rendered invalid if one branch of an organization administers a user agreement at each instance of signing a new contract on behalf of the organization, with the same parties, yet a second branch of the same organization administers its user agreements with new contracts involving the same parties as the first instance of signing. Where that first instance provided user consent that covers subsequent signings, re-obtaining consent may weaken or invalidate the initial consent when the documents to which the organization consents to have changed in some way. In one aspect the inconsistency between administration methods at both branches could introduce legal or other consequences. The present disclosure describes methods and systems for eliminating this risk by unifying the method in which consent is obtained and stored across an entire enterprise, even when the enterprise is geographically separated.

In yet other aspects, organizational risk may be minimized with aspects of the present disclosure by providing a consistent process for documentary versioning. For example, when an agreement with a user is executed, and user consents are recorded, conventional systems do not provide for tracking and administration of updated consents for newer versions. By managing consent across multiple versions with multiple users, and other organizational risk can be reduced by ensuring that valid consents with users are in place and properly recorded regardless of whether a document has been modified and/or updated.

Aspects of the present disclosure may also limit organizational risk by ensuring that digital consent given for particular product is documented in electronic form and saves to a persistent memory mechanism prior to use of that product. For example, if an individual, on behalf of an organization, establishes connectivity to a new software offered by an organization, in a conventional use case scenario, that individual could begin using the software before providing and saving their consents for the use of that software, and more particularly, for the data generated by the user using the software on behalf of their organization. According to one or more embodiments described herein, consents provided by the individual on behalf of the organization may also be systematically obtained and recorded by the data consent management tool 108 prior to generation of proprietary data that could have put the organization, user, and/or digital content provider at legal or other risk.

In another aspect, the integrity of a consented-to agreement, and the user experience of a user reviewing that agreement, may be enhanced by aspects described in the present disclosure by making user interfaces consistent across various product groups offered by the organization. For example, in conventional electronic consent systems, user agreements requiring user consent may be administered one way for product A, and inadvertently administered a different way for product B. Aspects of the present disclosure provide for consistent administration across multiple product groups (for example both of product groups A, and B), which can enhance the integrity of the consent by avoiding introduction of inconsistencies in obtaining the consent.

One or more embodiments of the present disclosure may also provide for consistent data retention across multiple branches of a large organization. For example, conventional systems do not provide for single-source data retention when recording electronic user agreements and/or electronic user consents.

While aspects of the present disclosure have been particularly shown and described with reference to the embodiments above, it will be understood by those skilled in the art that various additional embodiments may be contemplated by the modification of the disclosed machines, systems and methods without departing from the spirit and scope of what is disclosed. Such embodiments should be understood to fall within the scope of the present disclosure as determined based upon the claims and any equivalents thereof.

What is claimed is:

1. A system for managing an electronic consent, the system comprising:
 a computer-readable memory; and
  a processor in communication with the computer-readable memory, the processor enabled for:
  generating a core record identification (ID) associated with an electronic document, the generating comprising setting one or more data consent management rules indicative of whether the electronic document may be edited after saving the document to the computer-readable memory, the one or more access rules being associated with at least one administrator ID of an administrative user;
  determining, using the core record ID, an electronic consent content to display on a user device, the determining comprising:
   receiving a first consenting party ID associated with a first consenting party; and
   determining whether the first consenting party must provide an electronic consent based on one or more user consent rules, wherein the one or more user consent rules comprises: an organization consent rule associated with an organization, the organization consent rule indicative of i) whether consent is required at each access of a computing resource; and ii) whether per-user consent or organizational consent is required;
  transmitting the electronic consent content for display;
  obtaining an electronic consent from the first consenting party based at least in part on the first consenting party ID and the core record ID, wherein the electronic consent includes an indication of acknowledgement or agreement by the first consenting party to terms of the one or more electronic documents; and providing access to the computing resource based at least in part on the first consenting party ID and the core record ID.

2. The system of claim 1, the setting the one or more data consent management rules further comprising:

setting one or more user consent rules indicative of at least one type of electronic consent associated with the first consenting party ID and the electronic document.

3. The system of claim 1, the setting the one or more data consent management rules further comprising:

creating a document ID including i) a time stamp indicative of a date and a time that the electronic document is created and, ii) a version number indicative a version of the electronic document;

associating the one or more access rules, the one or more user consent rules, and the document ID with the core record ID; and storing the core record ID to the computer-readable memory, wherein the core record ID is accessible via a network-based central server.

4. The system of claim 1, the one or more data consent management rules further comprising an organization consent history including one or more of:

i) a consenting party record indicative of one or more consenting parties in an organization associated with the first consenting party ID that have provided a prior consent to the electronic document, and ii) a consent time record indicative of a date of the prior consent to the electronic document.

5. The system of claim 4, the obtaining the electronic consent from the consenting party further comprising:

retrieving, via the processor, the core record ID;

determining, via the processor, whether the first consenting party must provide the electronic consent prior to providing access to the computing resource based in part on the document ID, the first consenting party ID, the organization consent rule, and the organization consent history; and generating a request for the electronic consent from the first consenting party, wherein the request comprises an affirmative response and a decline response.

6. The system of claim 5, further comprising, responsive to the decline response, outputting a consequence message indicative of one or more aspects of the computing resource that are not accessible by the first consenting party.

7. The system of claim 6, further comprising updating, via the processor, the organizational consent history based on one of the affirmative response and the decline response.

8. The system of claim 1, further comprising a user electronic device, wherein transmitting the electronic consent content for display comprises:

transmitting the electronic consent to the user electronic device;

displaying the consent content via a display device operatively connected with the user electronic device; and obtaining the electronic consent from the first consenting party via the user electronic device.

9. A method for managing an electronic consent, comprising:

generating a core record identification (ID) associated with an electronic document via a processor, wherein generating the core record ID comprises setting one or more data consent management rules indicative of whether the electronic document may be edited after saving the electronic document to a computer-readable memory, the one or more data consent management rules being associated with at least one administrator ID of an administrative user;

determining, via the processor, using the core record ID, electronic consent content to display on a user device, the determining comprising:

receiving, via the processor, a first consenting party ID associated with a first consenting party; and determining whether the first consenting party must provide an electronic consent based on one or more user consent rules, wherein the one or more user consent rules comprises: an organization consent rule associated with an organization, the organization consent rule indicative of i) whether consent is required at each access of a computing resource; and ii) whether per-user consent or organizational consent is required;

transmitting the electronic consent content for display;

obtaining an electronic consent from the first consenting party based at least in part on the first consenting party ID and the core record ID, wherein the electronic consent includes an indication of acknowledgement or agreement by the first consenting party to terms of the one or more electronic documents; and providing access, via the processor, to the computing resource based at least in part on the first consenting party ID and the core record ID.

10. The method of claim 9, the setting the one or more data consent management rules further comprising:

setting one or more user consent rules indicative of at least one type of electronic consent associated with the first consenting party ID and the electronic document.

11. The method of claim 9, the setting the one or more data consent management rules further comprising:

creating a document ID including i) a time stamp indicative of a date and a time that the electronic document is created and, ii) a version number indicative of a version of the electronic document;

associating the one or more access rules, the one or more user consent rules, and the document ID with the core record ID; and storing the core record ID to the computer-readable memory, wherein the core record ID is accessible via a network-based central server.

12. The method of claim 9, the one or more data consent management rules further comprising an organization consent history indicative of one or more of:

i) a consenting party record indicative of one or more consenting parties in an organization associated with the first consenting party ID that have provided a prior consent to the electronic document, and ii) a consent time record indicative of a date of the prior consent to the electronic document.

13. The method of claim 12, the obtaining the electronic consent from the consenting party further comprising:

retrieving, via the processor, the core record ID;

determining, via the processor, whether the first consenting party must provide the electronic consent prior to providing access to the computing resource based in part on the document ID, the first consenting party ID, the organization consent rule, and the organization consent history; and generating a request for the electronic consent from the first consenting party, wherein the request comprises an affirmative response and a decline response.

14. The method of claim 13, further comprising, responsive to the decline response, outputting a consequence message indicative of one or more aspects of the computing resource that are not accessible by the first consenting party.

15. The method of claim 14, further comprising updating, via the processor, the organizational consent history based on one of the affirmative response and the decline response.

16. A non-transitory computer-readable medium comprising instructions for managing an electronic consent, the instructions executable by a processor to perform a method comprising:
- generating a core record identification (ID) associated with an electronic document via a processor, the generating comprising setting one or more access rules indicative of whether the electronic document may be edited after saving the document to a computer-readable memory, the one or more access rules being associated with at least one administrator ID of an administrative user;
- determining, via the processor, using the core record ID, an electronic consent content to display on a user device, the determining comprising:
  - receiving, via the processor, a first consenting party ID associated with a first consenting party; and
  - determining, via the processor, whether the first consenting party must provide an electronic consent based on one or more user consent rules, wherein the one or more user consent rules comprises: an organization consent rule associated with an organization, the organization consent rule indicative of i) whether consent is required at each access of a computing resource; and ii) whether per-user consent or organizational consent is required;
- transmitting the electronic consent content for display;
- obtaining an electronic consent from the first consenting party based at least in part on the first consenting party ID and the core record ID, wherein the electronic consent includes an indication of acknowledgement or agreement by the first consenting party to terms of the one or more electronic documents; and
- providing access, via the processor, to the computing resource based at least in part on the first consenting party ID and the core record ID.

17. The non-transitory computer-readable medium of claim 16, the setting the one or more data consent management further comprising:
- setting one or more user consent rules indicative of at least one type of electronic consent associated with the first consenting party ID and the electronic document.

18. The non-transitory computer-readable medium of claim 16, the setting the one or more data consent management rules further comprising:
- creating a document ID including i) a time stamp indicative of a date and a time that the electronic document is created and, ii) a version number indicative of a version of the electronic document;
- associating the one or more access rules, the one or more user consent rules, and the document ID with the core record ID; and
- storing the core record ID to the computer-readable memory, wherein the core record ID is accessible via a network-based central server.

19. The non-transitory computer-readable medium of claim 16, the one or more data consent management rules further comprising an organization consent history including of one or more of:
- i) a consenting party record indicative of one or more consenting parties in an organization associated with the first consenting party ID that have provided a prior consent to the electronic document, and
- ii) a consent time record indicative of a date of the prior consent to the electronic document.

20. The non-transitory computer-readable medium of claim 19, the obtaining the electronic consent from the consenting party further comprising:
- retrieving, via the processor, the core record ID;
- determining, via the processor, whether the first consenting party must provide the electronic consent prior to providing access to the computing resource based in part on the document ID, the first consenting party ID, the organization consent rule, and the organization consent history; and
- generating a request for the electronic consent from the first consenting party, wherein the request comprises an affirmative response and a decline response.

* * * * *